(12) United States Patent
Painter et al.

(10) Patent No.: US 12,129,192 B2
(45) Date of Patent: Oct. 29, 2024

(54) TREATMENT OF TAILINGS

(71) Applicant: EXTRAKT PROCESS SOLUTIONS, LLC, Bowling Green, KY (US)

(72) Inventors: Paul C. Painter, Boalsburg, PA (US); Bruce G. Miller, Boalsburg, PA (US); Aron Lupinsky, Boalsburg, PA (US)

(73) Assignee: EXTRAKT PROCESS SOLUTIONS, LLC, Bowling Green, KY (US)

( * ) Notice: Subject to any disclaimer, the term of this patent is extended or adjusted under 35 U.S.C. 154(b) by 643 days.

(21) Appl. No.: 16/511,787

(22) Filed: Jul. 15, 2019

(65) Prior Publication Data

US 2019/0337825 A1  Nov. 7, 2019

Related U.S. Application Data

(63) Continuation-in-part of application No. PCT/US2018/015423, filed on Jan. 26, 2018.

(60) Provisional application No. 62/699,335, filed on Jul. 17, 2018, provisional application No. 62/583,360, filed on Nov. 8, 2017, provisional application No. 62/554,220, filed on Sep. 5, 2017, provisional
(Continued)

(51) Int. Cl.
| | |
|---|---|
| *C02F 1/56* | (2023.01) |
| *C02F 1/52* | (2023.01) |
| *C02F 11/143* | (2019.01) |
| *C02F 11/148* | (2019.01) |
| *C02F 103/10* | (2006.01) |

(52) U.S. Cl.
CPC .......... *C02F 1/5245* (2013.01); *C02F 1/5272* (2013.01); *C02F 1/56* (2013.01); *C02F 11/143* (2019.01); *C02F 11/148* (2019.01); *C02F 2103/10* (2013.01)

(58) Field of Classification Search
CPC ........ C02F 1/5245; C02F 1/5272; C02F 1/56; C02F 11/143; C02F 11/148; C02F 2103/10; C02F 9/00
See application file for complete search history.

(56) References Cited

U.S. PATENT DOCUMENTS 3,544,442 A * 12/1970 Anderson ............. C02F 1/4674
                                                            204/275.1
3,963,599 A    6/1976 Davitt
(Continued)

FOREIGN PATENT DOCUMENTS

| CL | 2018001502 A1 | 8/2018 |
|---|---|---|
| CL | 2018002436 A1 | 1/2019 |

(Continued)

OTHER PUBLICATIONS

Office Action issued in corresponding Colombian Patent Application No. NC2019/0009139 dated Nov. 25, 2020, with English translation.
(Continued)

*Primary Examiner* — Chester T Barry
(74) *Attorney, Agent, or Firm* — Morgan, Lewis & Bockius LLP

(57) ABSTRACT

Processes of consolidating tailings such as from metal and non-metal based ore processes are disclosed. The processes include mixing tailings with a high concentration of a highly water soluble salt or an aqueous solution thereof to destabilize and consolidate solids in the tailings and separating the consolidated solids from process water.

20 Claims, 7 Drawing Sheets

Related U.S. Application Data application No. 62/535,398, filed on Jul. 21, 2017, provisional application No. 62/452,784, filed on Jan. 31, 2017.

(56) References Cited

U.S. PATENT DOCUMENTS

| | | | |
|---|---|---|---|
| 4,270,609 A | 6/1981 | Choules | |
| 4,376,693 A | 3/1983 | Warzel | |
| 4,676,908 A | 6/1987 | Ciepiela et al. | |
| 4,686,774 A | 8/1987 | Hiraiwa et al. | |
| 4,919,906 A | 4/1990 | Barber | |
| 7,077,963 B2 | 7/2006 | McConchie et al. | |
| 7,754,086 B2 * | 7/2010 | Whittaker | B01D 21/2461 210/734 |
| 7,875,188 B2 | 1/2011 | Dymond et al. | |
| 9,687,892 B2 | 6/2017 | Braun et al. | |
| 2003/0084693 A1 | 5/2003 | Sower | |
| 2005/0150844 A1 | 7/2005 | Hyndman et al. | |
| 2010/0102006 A1 | 4/2010 | Quevillon | |
| 2010/0307975 A1 * | 12/2010 | Johnson | C02F 9/00 204/240 |
| 2011/0000854 A1 * | 1/2011 | Nichols | C02F 1/288 210/666 |
| 2011/0131873 A1 | 6/2011 | Soane et al. | |
| 2011/0188935 A1 * | 8/2011 | McColl | B03D 3/06 405/74 |
| 2012/0145645 A1 * | 6/2012 | Wietholter | C02F 1/54 210/723 |
| 2012/0175315 A1 * | 7/2012 | Revington | B01F 5/0466 210/732 |
| 2012/0318170 A1 * | 12/2012 | Moffett | C04B 26/02 523/466 |
| 2013/0075340 A1 * | 3/2013 | Bara | C02F 9/00 210/729 |
| 2013/0105401 A1 | 5/2013 | Suh et al. | |
| 2013/0153511 A1 * | 6/2013 | Smits | C02F 1/5227 210/731 |
| 2013/0269943 A1 | 10/2013 | Gamache et al. | |
| 2013/0313167 A1 | 11/2013 | VanDeMierden | |
| 2014/0116956 A1 | 5/2014 | Yuan et al. | |
| 2014/0238943 A1 | 8/2014 | Favero et al. | |
| 2014/0377166 A1 * | 12/2014 | Soane | C02F 1/683 423/580.1 |
| 2015/0027929 A1 | 1/2015 | Watson et al. | |
| 2015/0368133 A1 | 12/2015 | Gamache et al. | |
| 2016/0059282 A1 * | 3/2016 | Moffett | C02F 1/5236 588/255 |
| 2016/0089706 A1 | 3/2016 | Read et al. | |
| 2017/0057838 A1 * | 3/2017 | MacKinnon | C02F 1/24 |
| 2017/0101332 A1 | 4/2017 | Soane et al. | |
| 2017/0320759 A1 | 11/2017 | Painter et al. | |
| 2017/0369788 A1 | 12/2017 | Lupinsky et al. | |
| 2018/0127290 A1 | 5/2018 | Utting et al. | |
| 2018/0362371 A1 | 12/2018 | Favero et al. | |
| 2019/0152823 A1 | 5/2019 | Omotoso et al. | |

FOREIGN PATENT DOCUMENTS

| | | | | |
|---|---|---|---|---|
| CL | 201902105 A1 | 3/2020 | | |
| CN | 1060450 A | 4/1992 | | |
| CN | 104603071 A | 5/2015 | | |
| CN | 106045189 A | 10/2016 | | |
| EP | 0 787 540 A1 | 8/1997 | | |
| EP | 1 790 732 A1 | 5/2007 | | |
| WO | 2011097357 A1 | 8/2011 | | |
| WO | 2011097367 A1 | 8/2011 | | |
| WO | 2014/111885 A1 | 7/2014 | | |
| WO | 2015083069 A1 | 6/2015 | | |
| WO | WO-2015083069 A | * | 6/2015 | B09B 1/00 |
| WO | 2016/174582 A1 | 11/2016 | | |
| WO | 2017/108930 A1 | 6/2017 | | |
| WO | 2017/112174 A1 | 6/2017 | | |
| WO | 2017/192748 A1 | 11/2017 | | |
| WO | 2017/223274 A1 | 12/2017 | | |
| WO | 2018/144336 A1 | 8/2018 | | |
| WO | 2019/018370 A3 | 1/2019 | | |
| WO | 2019/023054 A1 | 1/2019 | | |
| WO | 2019/023057 A3 | 1/2019 | | |

OTHER PUBLICATIONS

Office Action issued in corresponding Chinese Patent Application 201880009271.X dated Jul. 20, 2020, with English translation.

Office Action issued in corresponding Eurasian Patent Application No. 201991820/28 dated Mar. 29, 2020, with English translation.

International Search Report and Written Opinion dated Oct. 8, 2019 in corresponding PCT/US19/41751.

Veolia. "Zero Liquid Waste—Advanced Approach to Mine Water Management." VeoliaWaterTech, Veolia Water Technologies, Nov. 14, 2017, www.veoliawatertech.com/newsresources/datasheets/zero-liquid-waste.htm.

International Search Report issued in International Application No. PCT/US2018/15423 dated Apr. 13, 2018.

Written Opinion issued in International Application No. PCT/US2018/15423 dated Apr. 13, 2018.

Darrell Stonehouse, "Titanium Corporation wants to green oilsands tailings while extracting value from waste," JWN Energy, https://www.jwenergy.com/titanium-corporation-wants-green-froth-treatment-tailings-stream-while-extracting-value-out-bitumen-and-heavy-mineral-content/, Oct. 6, 2016.

Chemical Book, "Ammonium dihydrogen phosphate", Sep. 24, 2016, https://web.archive.orga/web/20160924151625/http://www.chemicalbook.com/ChemicalProductProperty_EN_CB6131092.htm.

Search Report issued in corresponding Chilean Application No. 202100127, dated Dec. 16, 2022. (U.S. Pat. No. 7,077,963 and VEOLIA cited therein have been cited in an earlier-filed SB08.).

Office Action issued in corresponding Chilean Application No. 202100127, dated Dec. 15, 2022. (U.S. Pat. No. 7,077,963 cited therein has been cited in an earlier-filed SB08.).

* cited by examiner

| A4 | B4 | C4 | D4 | E4 |
|---|---|---|---|---|
| 0.1% PAM | 0.08% PAM | 0.06% PAM | 0.04% PAM | 0.02% PAM |

2% $(NH_4)_2SO_4$

1% $(NH_4)_2SO_4$

TREATMENT OF TAILINGS

CROSS-REFERENCE TO RELATED APPLICATIONS

This application claims the benefit of U.S. Provisional Application No. 62/699,335, filed 17 Jul. 2018; and this application is a continuation-in-part of international application PCT/US2018/015423, filed 26 Jan. 2018, which claims the benefit of U.S. Provisional Application No. 62/452,784, filed 31 Jan. 2017, U.S. Provisional Application No. 62/535,398, filed 21 Jul. 2017, U.S. Provisional Application No. 62/554,220, filed 5 Sep. 2017, and U.S. Provisional Application No. 62/583,360, filed 8 Nov. 2017; the entire disclosures of each of which are hereby incorporated by reference herein.

TECHNICAL FIELD

The present disclosure relates to dewatering and consolidating aqueous compositions including solids such as tailings. Such tailings result from processing ore such as metal, phosphate and coal-based ores.

BACKGROUND

Various mining and extraction processes produce a tailings stream characterized as a slurry of particulate matter in water. These tailings often contain components that are hazardous and cannot be discharged directly into rivers and streams. A common practice is to store tailings in ponds, which can be very large or encompass numerous sites. For example, it has recently been estimated that Canadian oil-sands tailings ponds cover an area of about 200 square kilometers. In the U.S., the Environmental Protection Agency has identified more than 500 ash and coal slurry ponds, mostly in the Appalachian coal mining region. In Florida, phosphate mining results in the production of approximately 100,000 tons a day of phosphatic clays in the form of a slurry that is also stored in ponds. It is very difficult to dewater and the phosphate industry leaves about 40% of mined land in unstable clay settling areas. The processes for mining and extracting of ores of aluminum, copper, zinc, lead, gold, silver, etc., also create tailing streams. It is also of particular interest in processing ores to recycle water, but such recycling is hindered by particulate matter suspended in waste water.

The management and sustainability of tailings ponds pose significant and growing problems. The dams or impoundments used to form the ponds are often constructed from local material and are a significant potential danger. The failure of a coal slurry dam in West Virginia resulted in the Buffalo Creek flood, which killed more than 125 people. Various other, more recent, dam failures in tailings containment ponds have resulted in significant if not catastrophic environmental damage. For example, in 2016 the failure of a tailings dam in Henan province, China, released about 2 million cubic meters of red mud, totally immersing a nearby village. In 2015, a waste heap from Jade mining failed in Myanmar, killing at least 113 people.

In the oil sands industry, fines are defined as particles having a diameter equal to or less than 44 They are part of a waste stream that settles much more slowly than coarse sand, leaving a layer of water with some entrained fines near the surface of the ponds. This water is reused in the bitumen extraction process. Initially, most of the fines (mainly silica and clay particles) form an intermediate layer of so-called fluid fine tailings (FFT). This fluid has a low solids content, between 15% and 30% and is also referred to as thin fine tailings (TFT). Over time, additional settling occurs, but the negative surface charge of the mineral particles limits aggregation and a distinct layer of so-called mature fine tailings (MFT) is formed. The solids content of the MFT is on average about 30%, but varies with depth. It has gel-like properties that make it difficult to handle and dewater. It has been estimated that under the action of gravity alone, this tailings component could take decades to centuries to consolidate and settle and thus allow for land reclamation. The tailings from phosphate mining in Florida form a similar gel-like structure. Beneath a surface crust, these tailings have about a 25% solids content with a fluid-like consistency.

So-called impoundment ponds are used to store two types of waste from coal handling and combustion. Coal ash that is a residue of combustion is one such material and includes several components (fly ash, bottom ash, etc.). The EPA estimated that 100 million tons of coal ash was generated in the U.S. in 2012. There are dry methods of disposal and coal ash can also be recycled into building material, but for economic reasons the wet disposal of ash into ash ponds has been common practice. The EPA estimated that there are more than 500 units, presumably ash ponds, at more than 200 power plants. There are increasing environmental concerns regarding leachate from these ponds.

The second type of impoundment pond for coal processing wastes stores material that is a product of coal preparation plants, where soil and rock are removed from run-of-mine coal to lower its ash content and increase its value. This is accomplished by washing. However, this coal cleaning process produces a reject stream in the form of a sludge or slurry. This slurry contains very fine coal particles together with other material (such as clays) and, as with the tailings streams mentioned above, is very difficult to dewater economically using standard methods. There are now about 600 so-called slurry impoundments in the U.S. where this waste material is stored, mostly in the Appalachian coal mining region. The impoundments can be as large as 50 acres in size and contain billions of gallons of toxic sludge. This material represents both an economic cost in terms of the loss of a valuable resource (in the form of coal fines) and a major environmental hazard. The Washington Post (Apr. 24, 2013) reported that a study by the Office of Surface Mining Reclamation and Enforcement found that many sludge impoundment walls are weak and are known to leak. Historically, a number of catastrophic failures of ash and sludge ponds have occurred, resulting in significant loss of life and environmental devastation. With the coal industry in decline and mining companies filing for bankruptcy, the impoundment ponds, both those that remain in use and those that have been abandoned, are a significant and growing problem.

The production of alumina from bauxite also results in the generation of a large tailings stream. Approximately 77 million tons of a highly alkaline waste product composed mainly of iron oxide and known as red sludge or red mud is generated every year. This poses a significant disposal problem and a tailings dam failure led to catastrophic consequences, as described above.

There is a continuing need to manage and treat aqueous compositions including suspended solids, e.g., tailings, to reduce the volume of such tailings and/or to dewater and consolidate solids in such tailings and in a manner preferable for land reclamation, remediation and/or reclaiming water for use in mining operations.

SUMMARY OF THE DISCLOSURE

Advantages of the present disclosure include processes to dewater aqueous compositions including suspended solids, e.g., tailings, to produce high solids content materials.

These and other advantages are satisfied, at least in part, by a process of consolidating solids in tailings. The process comprises treating tailings with a highly water soluble salt. Advantageously, the process can include treating tailings with at least one highly water soluble salt or solution thereof and can optionally include either or both of (i) at least one polymer flocculant or solution thereof and/or (ii) optionally coarse particles, e.g., sand, to form a treated tailings. The treated tailings can include a consolidated material in the process water, which can then advantageously be separated from the consolidated material.

Implementations of the process of the present disclosure include, for example, (i) treating tailings with at least one highly water soluble salt to form a treated tailings including a consolidated material in the process water, (ii) treating tailings with at least one highly water soluble salt and at least one polymer flocculant to form a treated tailings including a consolidated material in the process water, (iii) treating tailings with at least one highly water soluble salt and coarse particles to form a treated tailings including a consolidated material in the process water, and (iv) treating tailings with at least one highly water soluble salt, at least one polymer flocculant and coarse particles to form a treated tailings including a consolidated material in the process water. Each of these implementations can include aqueous solutions of the salt and/or polymer flocculant to treat tailings. Each of these implementations can include separating the process water from the consolidated material. Advantageously, the consolidated materials can have a density greater than the process water.

Embodiments of the processes include one or more of the following features individually or combined. For example, the tailings subject to treatment can resulting from processing a metal-based ore, phosphate-based ore, or coal based ore. In some embodiments, the at least one highly water soluble salt can have a solubility in water (a salt/water solubility) of at least about 5 g/100 g at 20° C., e.g., at least about 10 g/100 g at 20° C. In other embodiments, the at least one highly water soluble salt is a non-hydrolyzing salt. In still further embodiments, the at least one highly water soluble salt can have a monovalent cation and can include an ammonium based salt, a phosphate based salt, or a sulfate based salt or combinations thereof.

In certain embodiments, the treated tailings can have a salt-tailings concentration of at least 0.5 wt % of the at least one highly water soluble salt and preferably no less than about 0.70 wt %, such as at least about 1 wt %, 1.25 wt %, 1.5 wt %, 1.75 wt %, 2 wt % and even at least about 2.5 wt %, 3 wt %, 4 wt %, 5 wt %, etc. of the at least one highly water soluble salt. In some embodiments, the at least one polymer flocculant is a polyacrylamide or co-polymer thereof. The treated tailings can have a polymer-tailings concentration of the at least one polymer flocculant of not less than zero and up to about 0.001 wt %, e.g., up to about 0.003 wt %, 0.005 wt %, 0.01 wt % or 0.04 wt %. In other embodiments, tailings are treated with coarse particles, e.g., sand, at a sand to fines ratio of less than 4:1, e.g., including about 2.5:1.0 to about 0.5:1 or including about 2.25:1 to about 0.75:1. Advantageously, when added, the polymer flocculant can form high density flocs, e.g., having a density greater than the process water, which facilitates separation and dewatering of the consolidated materials.

In various embodiments, treating tailings can include combining tailings with a solution including the at least one highly water soluble salt and the at least one polymer flocculant. In some embodiments, treating tailings can include combining a stream of tailings, e.g., tailings from processing metal ore such as copper ore, with a stream of a solution including the at least one highly water soluble salt and a separate stream of a solution including the at least one polymer flocculant. Alternatively, or in combination, treating tailings can include combining a stream of tailings with a stream of a solution including both the at least one highly water soluble salt and the at least one polymer flocculant. Coarse particles (e.g., sand) can also be added to tailings or stream thereof and/or to any or all of the solution streams. Advantageously, the streams can be mixed inline and/or with the aid of an inline mixer. In certain embodiments, treating tailings can be carried out at ambient temperature, e.g., no more than about 2° C. to about 5° C. above ambient. In other embodiments, treating tailings can be carried out a temperature of no more than about 50° C., e.g., no more than about 40° C. or 30° C. In still further embodiments, treating tailings includes using a solution of one or more highly soluble salts sourced from a natural or existing source such as seawater or a body of hypersaline water or sourced from a brine waste stream.

In still further embodiments, the process water can be separated from the consolidated material by any one or more of decanting, filtering, vacuuming, gravity draining, electro-filtering, etc. or combinations thereof. In various embodiments, separating the process water from the consolidated material can include mechanically dewatering the consolidated material, e.g., mechanically dewatering the consolidated material by a dewatering screw, industrial filter, etc. Once separated, the consolidated material can be transferred for further dewatering or disposal.

In practicing aspects of the processes of the present disclosure and the various embodiments thereof, the separated process water can include the at least one highly water soluble salt and the process can further comprise one or more of: (i) recovering at least a portion of the separated process water; (ii) recycling at least a portion of recovered separated process water to treat additional tailings; (iii) purifying at least a portion of recovered process water; or (iv) concentrating the at least one highly water soluble salt in recovered process water to form a brine and using the brine to treat additional tailings.

Yet another aspect of the present disclosure includes recovering valuable materials from the aqueous composition of fines, e.g., tailings. The valuable materials can include rare earth elements (REE) associated with solids such as clays in tailings from various types of aqueous fines such as tailings stream. Therefore, in practicing certain aspects of the processes of the present disclosure and the various embodiments thereof, the aqueous compositions can further include rare earth element materials which can be recovered by treating tailings with at least one highly water soluble salt, e.g., an ammonium based salt such as ammonium sulfate, to form a treated tailings including REE in the process water and/or in the consolidated materials. In some embodiments, the process further includes separating the process water from the consolidated material and recovering the REE from the separated process water and/or the consolidated materials.

Advantageously, the processes of the present disclosure can consolidate the solids of tailings to produce a consolidated material having a solids content in excess of about 45% by weight, e.g., a solids content of greater than about 50% and higher than about 60%, 65%, 70% and 75% by weight.

In practicing certain aspects of the processes of the present disclosure and the various embodiments thereof, the consolidated material formed in the treated tailings according to certain embodiments can result in a high solids content after mixing and/or dewatering the treated tailings in a short period of time. In some embodiments, the consolidated material can have a solids content of greater than about 50% and at least about 60%, 65%, 70%, 75% and 80% by weight after mixing and/or dewatering.

Another aspect of the present disclosure includes an aqueous solution for treating aqueous fines. The aqueous solution includes a highly water soluble ammonium based salt and a polymer flocculant, e.g., a water soluble polymer. Embodiments include, together or individually, an aqueous solution of one or more of the highly water soluble salt(s) and having a concentration of no less than about 1 wt %, e.g., at least about 2 wt %, 5 wt %, 10 wt %, 20 wt %, 30 wt % and even as great as a 40 wt % or as an aqueous salt slurry. The aqueous solution can also include one or more of the polymer flocculant(s) and having a concentration of not less than zero and up to about 0.005 wt %, e.g., up to about 0.01 wt %, 0.04 wt %, 0.05 wt %, 0.1 wt %, 0.2 wt %, 0.4 wt %, for example.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1A:
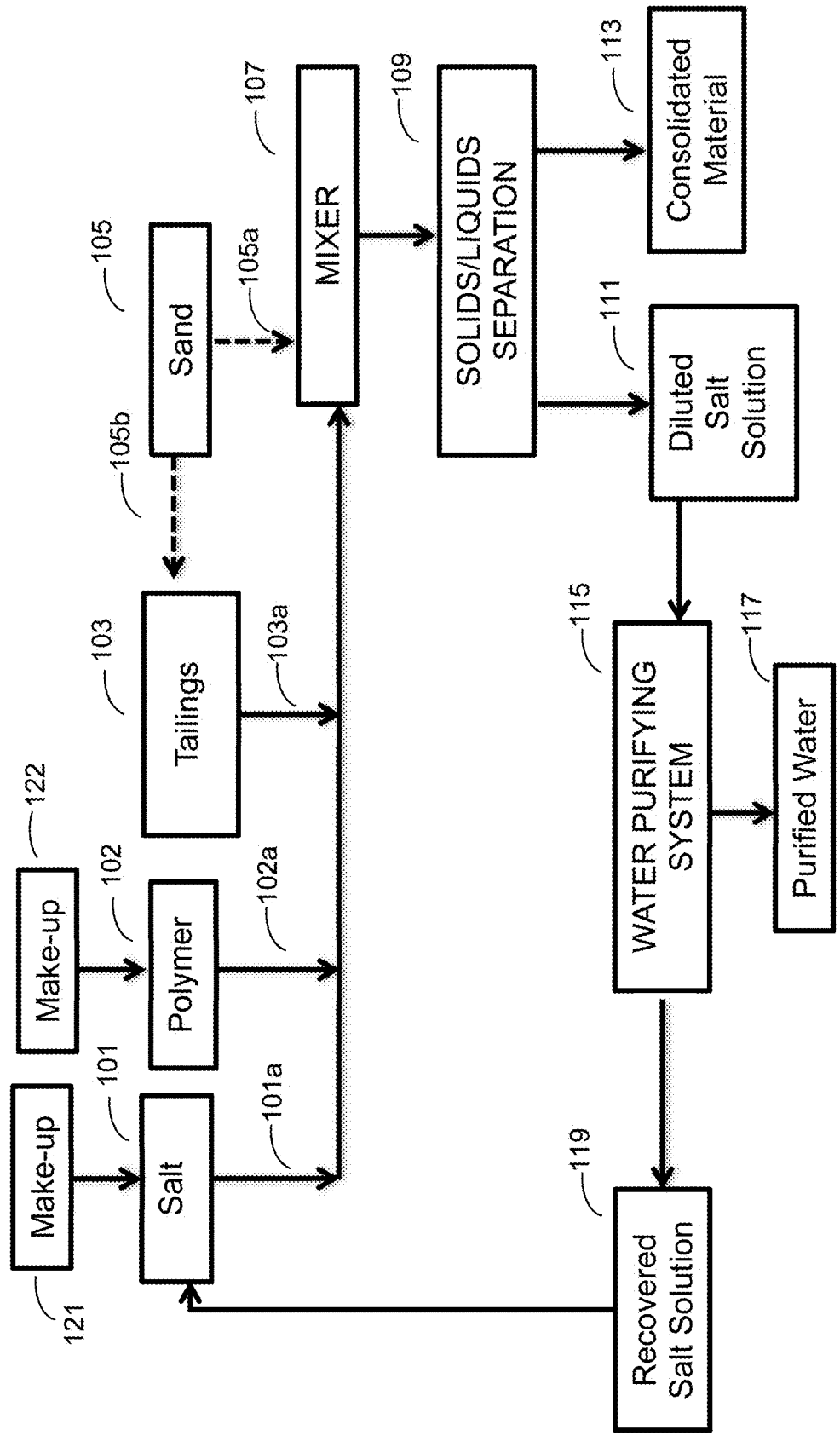
FIG. 1A schematically illustrates a process of consolidating a tailings stream in accordance with aspects of the present disclosure.

The present disclosure relates to treating tailings and other aqueous compositions which include solids to consolidate and dewater the tailings. Tailings are typically produced when mining and processing ores such as metal-based ores, e.g., aluminum, copper, zinc, lead, iron, gold, silver, molybdenum, lithium, etc., non-metal based ores, e.g., phosphate ore, nitrate ore, iodine ore, oil sands, etc. Aqueous compositions of fines can also be produced when processing coal. For example, certain processes finely grind coal prior to combustion to more readily liberate pyrite (a sulfur based compound) and hence reduce sulfur emissions upon combustion of the ground coal. Such processes can produce fine coal particles as well as other fine mineral or mineral matter in an aqueous composition that are difficult to recapture and reuse.

Particulate solids in the tailings or aqueous compositions of the present disclosure can be minerals and mineral like materials, i.e., mineral matter, clays, slit, and in sizes ranging from fines to coarse solids. The term fines as used herein is consistent with the Canadian oil sands classification system and means solid particles with sizes equal to or less than 44 microns ($\mu$m). Sand is considered solid particles with sizes greater than 44 $\mu$m. The composition of the fines depends on the source of the materials, but generally fines are comprised mostly of silt and clay material and sometimes minerals or mineral matter, depending on the ore. Tailings can have various solids contents and various amounts of fines as its solids content. The tailings treated according to embodiments of the present disclosure can include a significant amount of fines by weight (>5 wt %) as their solids content. Such tailings can include at least about 10 wt %, 20 wt %, 30 wt %, 40 wt %, 50 wt %, 60 wt %, 70 wt % or higher fines as their solids content.

Advantageously, the process of the present disclosure can consolidate the solids of tailings to produce consolidated material having a solids content in excess of about 45% by weight, e.g., a solids content of greater than about 50% and higher than about 60%, 65%, 70% and 75% by weight.

The terms coagulation and flocculation are often used interchangeably in the literature. As used herein, however, coagulation means particle aggregation brought about by the addition of hydrolyzing salts, whereas flocculation means particle aggregation induced by flocculating polymers. Hydrolyzing salts undergo hydrolysis when added to water to form metal hydroxides, which precipitate from the solution, trapping fines and other minerals in the coagulating mass. Hydrolyzing salts typically have low solubility in water and are used as coagulants. Aggregation induced by flocculation, in contrast, is believed to be the result of the polymer binding to the particles thereby tying the particles together into a so called floc causing aggregation of the particles.

In practicing aspects of the present disclosure, tailings, and other an aqueous composition of solids and process water, can be consolidated by treating the tailings with one or more highly water soluble salt(s) or an aqueous solution thereof to destabilize and consolidate solids in the tailings, e.g., to destabilize and consolidate coarse solids and fines in tailings. Aggregation induced by the addition of salts is believed to be the result of destabilizing the particles suspended in the fluid by an alteration or a shielding of the surface electrical charge of the particles to reduce the inter-particle repulsive forces that prevent aggregation. In certain embodiments, tailings, e.g., a suspension of particulate solids, which can include fines, in process water are treated. Such tailings that can be treated include tailings streams from processing metal-based ores, non-metal based ores, or a coal slurry. The process includes treating the tailings with a highly water soluble salt(s) or an aqueous solution thereof to form a treated tailings including a consolidated material, e.g., consolidated solids and/or fines, in process water. The process water can then be separated from the consolidated material. Advantageously, the consolidated material has a solids content of at least 45% by weight, e.g., a solids content of greater than about 50% and higher than about 60%, 65%, 70% and 75% by weight.

Salts that are useful in practicing the present disclosure include salts that are highly soluble in water. A highly water soluble salt as used herein is one that has a solubility in water of greater than 2 g of salt per 100 g of water (i.e., a salt/water solubility of 2 g/100 g) at 20° C. Preferably the highly water soluble salt has a water solubility of at least about 5 g/100 g at 20° C., e.g., at least about 10 g/100 g of salt/water at 20° C.

In addition, the highly water soluble salts used in the processes of the present disclosure are preferably non-hydrolyzing. Hydrolyzing salts undergo hydrolysis when added to water to form metal hydroxides, which precipitate from the solution. Such hydrolyzing salts are believed to form open flocs with inferior solids content and cannot be readily recycled for use with additional tailings in continuous or semi-continuous processes. In addition, hydrolyzing salts typically have low solubility in water and are used at elevated temperatures to ensure sufficient solubility for aggregation, which is an energy intensive process. See U.S. Pat. No. 4,225,433 which discloses the use of lime as a coagulating agent at a temperature of 75° C.

Further, the highly water soluble salts are preferably not carboxylate salts since such organic acid salts tend to be more expensive than inorganic salts and can be deleterious to plant and/or animal life.

Highly water soluble salts that are not hydrolyzing and useful in practicing processes of the present disclosure include salts having a monovalent cation, e.g., alkali halide salts such as sodium chloride, potassium chloride; also salts with monovalent cations such as sodium nitrate, potassium nitrate, sodium and potassium phosphates, sodium and potassium sulfates, etc. are useful in practicing processes of the present disclosure. Other monovalent cationic salts useful in practicing processes of the present disclosure include ammonium based salts such as ammonium acetate ($NH_4C_2H_3O_2$), ammonium chloride ($NH_4Cl$), ammonium bromide ($NH_4Br$), ammonium carbonate (($NH_4)_2CO_3$), ammonium bicarbonate ($NH_4HCO_3$), ammonium nitrate ($NH_4NO_3$), ammonium sulfate (($NH_4)_2SO_4$), ammonium hydrogen sulfate ($NH_4HSO_4$), ammonium dihydrogen phosphate ($NH_4H_2PO_4$), ammonium hydrogen phosphate (($NH_4)_2 HPO_4$), ammonium phosphate (($NH_4)_3PO_4$), etc. Mixtures of such salts can also be used.

Ammonium based salts are useful for practicing the present disclosure since residual ammonium based salts on the consolidated material after combining the salt with the aqueous fines, e.g., tailings, can be beneficial to plant life. In fact, many of the ammonium based salts are useful as fertilizers, e.g., ammonium chloride, ammonium nitrate, ammonium sulfate, etc. Many of the monovalent sulfate and phosphate salts are also useful as fertilizers. In certain embodiments of the present disclosure, the highly water soluble salt or salts used in the processes of the present disclosure can preferably be non-toxic and beneficial to plant life to aid in environmental remediation and the restoration of mine sites.

Highly water soluble salts that can be used in practicing the present process can also include salts having multivalent cations. Such salts include, for example, divalent cation salts such as calcium and magnesium cation salts, such as calcium chloride ($CaCl_2$)), calcium bromide ($CaBr_2$), calcium nitrate ($Ca(NO_3)_2$), magnesium chloride ($MgCl_2$), magnesium bromide ($MgBr_2$), magnesium nitrate ($Mg(NO_3)_2$), magnesium sulfate ($MgSO_4$); and trivalent cation salts such as aluminum and iron (III) cation salts, e.g., aluminum chloride ($AlCl_3$), aluminum nitrate ($Al(NO_3)_3$), aluminum sulfate ($Al_2(SO_4)_3$), iron (III) chloride ($FeCl_3$), iron (III) nitrate ($Fe(NO_3)_3$), iron (III) sulfate ($Fe_2(SO_4)_3$), etc. As explained above, the highly water soluble salts used in the processes of the present disclosure are preferably non-hydrolyzing. Many of the multivalent cation salts are hydrolyzing and thus less preferred for the reasons stated above. Moreover, experimentation with multivalent salts showed increased fouling of containers and formation of less cohesive consolidated materials as compared to highly water soluble salts having monovalent cations. In addition, some multivalent salts, such as $FeCl_3$ and $Fe_2(SO_4)_3$, are particularly corrosive and $Fe_2(SO_4)_3$ is formed from oxidizing pyrite and results in acid mine run-off, which make such salts less preferable for use in processes of the present disclosure.

When a sufficiently high concentration of the highly water soluble salt is included in the treated tailings, the salt can destabilize and consolidate solids in tailings. For a relatively short process times with a relatively low energy input, the salt-tailings concentration of the at least one highly water soluble salt should preferably be at least 0.5 wt % and preferably no less than about 0.70 wt %, such as at least about 1 wt %, 1.25 wt %, 1.5 wt %, 1.75 wt %, 2 wt % and even at least about 2.5 wt %, 3 wt %, 4 wt %, 5 wt %, etc. The term "salt-tailings concentration" as used herein refers to the concentration of the highly water soluble salt(s) in the treated tailings and is determined by taking the percentage of the mass of highly water soluble salt(s) divided by the combined mass of the salt(s) plus the tailings and any water used to dilute the salt(s). For example, combining 1 part undiluted (i.e., neat) salt to 99 parts tailings by weight results in a salt-tailings concentration of 1 wt %. Alternatively, treating tailings with an equal weight of a 2 wt % solution of the salt also results in a salt-tailings concentration of 1 wt % in the treated tailings.

The highly water soluble salt(s) can be used to treat compositions of the present disclosure as a solid, e.g., combining the salt as a powder with tailings. Alternatively, the salt can be used to treat as a solution, e.g., combining an aqueous salt solution with tailings. In some aspects of the present disclosure, an aqueous solution of the highly water soluble salt can be prepared having a concentration of no less than about 1 wt %, e.g., greater than about 2 wt %, 5 wt %, 10 wt %, 20 wt %, 30 wt % and even as great as a 40 wt % or as an aqueous salt slurry. The tailings and salt solution or slurry should be mixed at a ratio sufficient to destabilize the tailings to cause consolidation of the solids therein. In one aspect of the present disclosure, the tailings and the salt solution can be mixed at a ratio of tailings to salt solution at a range of about 80:1 to 1:1, e.g., 70:1 to 1:1, 50:1 to 1:1, 30:1 to 1:1, 20:1 to 1:1, 15:1 to 1:1, 10:1 to 1:1, 5:1 to 1:1, and/or about 2:1 to 1:1 tailings to salt solution.

In some embodiments of the present processes, it can be more advantageous to use a natural source of a highly soluble salt or salts such as in a natural body of water including such salts in sufficiently high concentration such as at least about 2 wt % and even at least about 3 wt % or greater. For example, ocean or seawater can be used as a source of highly soluble salts, which can significantly improve the economics of the process under certain conditions. The vast majority of seawater has a salinity of between 31 g/kg and 38 g/kg, that is, 3.1-3.8%. On average, seawater in the world's oceans has a salinity of about 3.5% (35 g/L, 599 mM). Seawater includes of a mixture of salts, containing not only sodium cations and chlorine anions (together totaling about 85% of the dissolved salts present), but also sulfate anions and calcium, potassium and magnesium cations. There are other ions present (such as bicarbonate), but these are the main components. Another natural source of highly soluble salts that can be used as a source of highly soluble salts includes a hypersaline body of water, e.g., a hypersaline lake, pond, or reservoir. A hypersaline body of water is a body of water that has a high concentration of sodium chloride and other highly soluble salts with saline levels surpassing ocean water, e.g., greater than 3.8 wt % and typically greater than about 10 wt %. Such hypersaline bodies of water are located on the surface of the earth and also subsurface, which can be brought to the surface as a result of ore mining operations.

In other embodiments of the present processes, it can be advantageous to use a brine produced in desalinization of salt water as a source of a highly soluble salt(s). The brine can be used alone as a source of a highly soluble salt(s) or in combination with another source of a highly soluble salt(s) such as seawater. Seawater has been used in grinding and flotation processes of mining copper ore. See Moreno et al., "The use of seawater as process water at Las Luces copper-molybdenum beneficiation plant in Taltal (Chile)", Minerals Engineering 2011:24:852-858. However, use of seawater requires increased capital and maintenance costs to combat the corrosive effects of seawater. Id. Seawater can also adversely affect yield of producing certain copper minerals. See Jeldres et al., "Effect of seawater on sulfide ore flotation: a review", Mineral Processing and Extractive Metallurgy Review 2016:37(6):369-384. To offset adverse effects of seawater, some mining operations desalinate the seawater to produce desalted water for their mining operations. Desalinating seawater, however, produces a waste brine stream. See Galvez et al., "Innovative Solutions for Seawater Use in Mining Operations, Case Study of Innovative Projects Bernardo Llamas, IntechOpen", DOI: 10.5772/intechopen.68191, Published Aug. 30, 2017. It is believed that neither seawater has nor waste brine has been used to treat tailings. Hence, in some implementations the present processes, tailings from ore processes, such as metal or processes, can be treated with a waste brine from desalinization as a source of the at least one highly water soluble salt, with or without other sources of highly soluble salt(s) such as seawater.

After treating the tailings with at least one highly water soluble salt, the solids in the tailings can be consolidated such as by mixing followed by gravity sedimentation in a settling tank or by mechanically consolidation such as by pressing or centrifugation to increase the rate of forming a consolidated material in the treated tailings. The consolidated material can be separated from the process water by decanting, filtering, electrofiltration, cross-flow filtering, vacuuming, and/or by mechanical dewatering, i.e., applying an external force to the consolidated material. Once separated, the consolidated material can be transferred for further dewatering or disposal.

Although highly water soluble salts can destabilize and consolidate solids in the tailings, it was found that the process could be significantly improved by adding one or more polymer flocculant(s). The addition of a polymer flocculant to the treated tailings reduced the time for forming a consolidated material.

The one or more polymer flocculants(s) can be added concurrent with or subsequent to treating the tailings with the at least one highly water soluble salt to form the treated tailings. The one or more polymer flocculants(s) can also be added prior to treating the tailings with the at least one highly water soluble salt but it appeared more effective to add flocculant, even with tailings already containing polymer flocculant such as thickener underflow tailings, concurrent with or subsequent with the at least one highly water soluble salt to form the treated tailings.

In addition, the processes of the present disclosure can also include treating aqueous fines with coarse particles, e.g., particles with sizes greater than 44 μm, such as sand, to significantly increase the solids content. Mixing with sand is appropriate for aqueous fines that have solids mostly as fines, as the fine particles can sit in the voids between the coarse particles, enhancing packing and solids content. It was found, however, that for certain compositions such as coal slurry and metal ore tailings, the addition of sand was not needed to achieve a high solids content, as there were sufficient coarse particles present in the tailings to give a high solids content material within a short period of time.

Hence, implementations of the process of the present disclosure include, for example, (i) treating tailings with at least one highly water soluble salt to form a treated tailings including a consolidated material in the process water, (ii) treating tailings with at least one highly water soluble salt and at least one polymer flocculant to form a treated tailings including a consolidated material in the process water, (iii) treating tailings with at least one highly water soluble salt and coarse particles to form a treated tailings including a consolidated material in the process water, and (iv) treating tailings with at least one highly water soluble salt, at least one polymer flocculant and coarse particles to form a treated tailings including a consolidated material in the process water. Each of these implementations can include aqueous solutions of the salt and/or polymer flocculant to treat the tailings. Each of these implementations can include separating the process water from the consolidated material. Advantageously, the consolidated material has a density greater than the process water. The process water can then be readily separated from the consolidated material as, for example, by one or more of decanting, filtering, gravity draining, electrofiltering, cross-flow filtering, vacuuming and other evaporating techniques, etc. and/or by one or more of a device for dewatering consolidated material such as a centrifuge, decanting centrifuge, dewatering screw, hydrocyclone, vacuum belt filter, filter press or pressing devices, etc. In addition, the separated consolidated material can be disposed or deposited in a containment structure which allows removal of released water from the consolidated material. In addition, the process water separated from the treated tailings can be cycled back to treat additional tailings.

Polymers that are useful in practicing the present disclosure include water soluble flocculating polymers such as polyacrylamides or copolymers thereof such as a nonionic polyacrylamide, an anionic polyacrylamide (APAM) such as a polyacrylamide-co-acrylic acid, and a cationic polyacrylamide (CPAM), which can contain co-monomers such as acryloxyethyltrimethyl ammonium chloride, methacryloxyethyltrimethyl ammonium chloride, dimethyldiallyammonium chloride (DMDAAC), etc. Other water soluble flocculating polymers useful for practicing the present disclosure include a polyamine, such as a polyamine or quaternized form thereof, e.g., polyacrylamide-co-dimethylaminoethylacrylate in quaternized form, a polyethyleneimine, a polydiallyldimethyl ammonium chloride, a polydicyandiamide, or their copolymers, a polyamide-co-amine, polyelectrolytes such as a sulfonated polystyrenes can also be used. Other water soluble polymers such as polyethylene oxide and its copolymers can also be used. The polymer flocculants can be synthesized in the form of a variety of molecular weights (MW), electric charge types and charge density to suit specific requirements. Advantageously, the flocculating polymer used in practicing processes of the present disclosure do not include use of activated polysaccharides or activated starches, i.e., polysaccharides and starches that have been heat treated, in sufficient amounts to lower the density of the floc to below the density of the process water from which they are separated. Such activated polysaccharides and activated starches when used in sufficiently high dosages tend to form low density flocs which rise to the surface of an aqueous composition, which can hinder removal of solids in large scale operations involving high solids content and can also hinder dewatering of consolidated material.

The amount of polymer(s) used to treat tailings should preferably be sufficient to flocculate the solids in tailings and any added coarse particles, e.g., sand. The amount of polymer(s) used to treat tailings can be characterized as a concentration based on the total weight of tailings or as a dosage based on the weight percent of the solids in tailings.

In some embodiments of the present disclosure, the concentration of the one or more polymer flocculant(s) in the treated tailings has a polymer-tailings concentration of up to about 0.001 wt %, e.g., up to about 0.003 wt %, 0.005 wt % or up to about 0.01 wt %. For relatively short processing times, consolidation of the solids can be obtained at polymer-tailings concentrations of no less than about 0.04 wt %. The term "polymer-tailings concentration" as used herein refers to the concentration of the flocculating polymer(s) in the treated tailings and is determined by taking the percentage of the mass of the polymer(s) divided by the combined mass of the polymer(s) plus the tailings and any water used to dissolve the polymer(s). For example, combining 1 part undiluted (i.e., neat) polymer to 9999 parts tailings by weight results in a polymer-tailings concentration of 0.01 wt %. Alternatively, treating tailings with an equal weight of a 0.02 wt % solution of the polymer also results in a tailings concentration of 0.01 wt %. In certain embodiments, tailings are treated with at least one polymer flocculant to yield a polymer-tailings concentration of up to about 0.02 wt %, such as up to about 0.03 wt %, 0.04 wt %, 0.05 wt %, and even up to about 0.07 wt %, 0.09 wt %, 0.1 wt %, 0.2 wt %, etc. The amount of polymer flocculant can be used in greater concentrations. However, at high concentrations it becomes difficult to dissolve the flocculant, the solution becomes too viscous, and the process is less economical.

In some embodiments of the present disclosure, the concentration of the one or more polymer flocculant(s) in the treated tailings, has a dosage (weight of the flocculant(s) to weight of the solids in the tailings) of no less than zero and up to about 0.005 wt %, e.g., up to about 0.01 wt % and in some implementations up to about 0.015 wt %, 0.020 wt %, 0.025 wt %, 0.03 wt %, or 0.04 wt %.

The amount of polymer flocculant can be reduced if the salt-tailings concentration is increased. While the reason for this effect is not clear, a very low polymer-tailings concentration of up to about 0.001 wt %, e.g., up to about 0.003 wt %, 0.005 wt %, 0.01 wt %, 0.02 wt %, 0.03 wt %, 0.04 wt %, 0.05 wt %, for example, can achieve reasonably fast consolidation of solids in tailings, if the salt-tailings concentration is increased.

Coarse particles useful for practicing certain processes according to the present disclosure are preferably sand and when used in treating compositions the amount of such particles are preferably in a sand to fines ratio (SFR ratio) of less than 4:1, e.g., including about 2.5:1.0 to about 0.5:1 or including about 2.25:1 to about 0.75:1. The SFR ratio is calculated by determining the amount of sand added to an estimated amount of solid fines in the aqueous fines on a weight basis. It is believed that the use of coarse particles facilitates packing of the consolidated fines which advantageously increases the solids content and can even form a jammed structure of consolidated solids, i.e. a structure in which generally individual particles of the consolidated solid can no longer move freely relative to other particles.

Treating tailings, e.g., tailings from metal ore and non-metal ore processes, with at least one highly water soluble salt and optionally with either or both of at least one polymer flocculant and/or optionally sand can be carried out in a number of ways. In certain embodiments, treating the tailings includes combining and/or mixing the various components. In addition, the at least one salt can be added directly to the tailings either as an undiluted solid in powder form or as a solution; the at least one polymer flocculant can be added directly to the tailings either as an undiluted material or as a solution, and optionally coarse particles (e.g., sand) can be added to the tailings directly or with the salt and/or polymer or solutions thereof. The salt and polymer can be combined in a single solution, with or without sand, and combined with the tailings. The order of combining the salt, polymer, and optionally sand, to the tailings can give equivalent results and optimization of the process will depend on the nature of tailings, and the scale and equipment used in the process.

However, it tends to be more convenient to use one or more solutions including the one or more highly water soluble salt(s) and the one or more polymer flocculant(s) followed by combining the one or more solutions with the tailings. In certain embodiments, an aqueous solution of one or more highly water soluble salt(s) can be used having a concentration of no less than about 0.5 wt % or 1 wt %, e.g., at least about 2 wt %, 3 wt %, 4 wt %, 5 wt %, 6 wt %, 7 wt %, 8 wt %, 10 wt %, 15 wt %, 20 wt %, 30 wt % and even as great as a 40 wt % or as an aqueous salt slurry for use in treating the tailings. The one or more polymer flocculant(s) can also be included in the aqueous solution of the salt(s) and can have a concentration of up to about 0.005 wt %, e.g., up to about 0.01 wt %, 0.04 wt %, 0.05 wt %, 0.1 wt %, 0.2 wt %, 0.4 wt %, for example. The aqueous solution of the highly water soluble salt(s) and polymer flocculant(s) can be used to treat the tailings and can be combined with such tailings at a ratio of tailings to salt solution at a range of about 80:1 to 1:1, e.g., 70:1 to 1:1, 50:1 to 1:1, 30:1 to 1:1, 20:1 to 1:1, 15:1 to 1:1, 10:1 to 1:1, 5:1 to 1:1, and/or about 2:1 to 1:1 tailings to salt solution. Optionally, sand can be combined with the tailings before, during, or after combining the tailings with the aqueous solution of salt and/or polymer flocculant.

Because highly water soluble salts and polymer flocculants that are preferably water soluble are used in the process of the present disclosure, the temperature of the treated tailings need not be elevated above ambient temperature to practice the process. In certain embodiments, treating the tailings according to the various embodiments herein can be carried out at about ambient temperature or no more about 2 to about 5° C. above ambient temperature. In other embodiments, treating the aqueous coal waste composition can be carried out at a temperature of no more than about 50° C., e.g., no more than about 40° C. or 30° C.

In practicing aspects of the present disclosure, tailings, e.g., tailings from metal ore and non-metal ore processes, can be consolidated by treating such tailings with at least one highly water soluble salt or aqueous solutions thereof and can optionally include either or both of at least one polymer flocculant, e.g., a water-soluble flocculating polymer, or aqueous solutions thereof, and/or optionally coarse particles, e.g., sand to form a treated tailings. Treating tailings in this manner can cause destabilization and consolidation of the solids, e.g., fines and coarse solids, in the treated tailings to form a consolidated material, which can aggregate relatively quickly, in the process water.

The treated tailings and/or consolidated material can be further dewatered to further separate the process water from the consolidated material and, in some instances, further consolidate the solids. In some embodiments, the consolidated material formed in the treated tailings can be separated from the process water by any one or more of decanting, filtering, e.g., electrofiltering, cross-flow filtering, gravity draining, vacuuming and other evaporating techniques, etc. and/or by any one or more of a mechanical dewatering, i.e., applying an external force to the consolidated material, with a device for dewatering consolidated material such as by applying a centrifuge, decanting centrifuge, dewatering screw, hydrocyclone, filter press, pressing device, etc. or combinations thereof. In one aspect of the processes of the present disclosure, the process water can be separated from the consolidated material by passing a stream of treated tailings through a cross-flow filter, e.g., a porous or slotted pipe, which filters and dewaters the treated tailings stream to separate the process water from the consolidated material. The process water can then be readily separated from the consolidated material. In another aspect of the processes of the present disclosure, the process water can be separated from the consolidated material by gravity draining to achieve a solids content of at least about 70% within about a month after treating the tailings, e.g., within about two weeks or within about one week of gravity draining after treating the tailings. In still further aspect of the processes of the present disclosure, the consolidated material can be further dewatered after separating from the treated tailings by depositing the separated consolidated material in a thin lift deposition.

The consolidated material formed in the treated tailings can advantageously have a high solids content, e.g., a solids content of greater than about 50% and at least about 60%, 65%, 70% and 75% by weight. In addition, the consolidated material formed in the treated tailings according to certain embodiments can result in a high solids content after mixing and/or dewatering the treated tailings in a short period. In embodiments of the present disclosure, the consolidated material can have a solids content of greater than about 50% and at least about 60%, 65%, 70%, 75% and 80% by weight after mixing and/or dewatering. In certain embodiments a solids content of at least about 70% is achieved within about one month of gravity draining after treating tailings, e.g., within about two weeks or within about one week of gravity draining after treating tailings.

In an embodiment of the present disclosure, the process includes mixing the tailings with a highly water soluble salt, e.g., an ammonium based salt, a water soluble polymer, e.g., a polyacrylamide, and optionally sand, such as in a sand to fines ratio of between about 2.25:1 to about 0.75:1 to form a treated tailings including a consolidated material having a high solids content, e.g., a solids content of greater than about 50% by weight, e.g., at least about 60%, 65%, 70 wt % or higher in less than 10 minutes, depending on the dewatering method used.

Another advantage of the processes of the present disclosure is the recovery of materials from tailings that include rare earth elements. For example, certain tailings can include valuable minerals that include rare earth elements. A rare earth element (REE), as defined by IUPAC, is one of a set of seventeen chemical elements in the periodic table, specifically the fifteen lanthanides, as well as scandium and yttrium. Scandium and yttrium are considered rare earth elements because they tend to occur in the same ore deposits as the lanthanides and exhibit similar chemical properties. Many of the REE are used in electronic devices, magnets, high performance coatings. Such REE include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y).

REE in aqueous fines are typically in the form of an ion or oxide. For example, zirconium can be present as zircon, $ZrSiO_4$, titanium can be present as the minerals ilmenite, leucoxene and rutile. Coal ash and coal cleaning wastes contain rare earth elements. Fire clay coal ash has unusually high concentrations of Yttrium and zirconium. Oil sands tailings also contain REE.

The processes of the present disclosure are useful in recovering REE. It is believed that in some tailings, REEs absorb on the surface of clays in tailings. In other tailings, REEs are predominately included among the solids of the tailings but can also be in the process water. Absorbed REEs can be exchanged with the highly water soluble salts of the present disclosure, e.g., ammonium based salts due to an exchange of ammonium ions for the REE ions. REEs from the solids of the tailings can be obtained by leaching the solids with acid followed by extraction and precipitation or by caustic decomposition followed by acid leaching.

Another aspect of processes of the present disclosure includes consolidating tailings, which include REE materials, by treating the tailings with at least one highly water soluble salt, e.g., an ammonium based salt such as ammonium sulfate, to form a treated tailings including a consolidated material in process water which includes the REE materials in the process water and/or among the consolidated materials. In one aspect of the present disclosure, the treated tailings consolidate the fines and also separates REE materials from the solids and into the process water. The process water can then be separated from the consolidated material and the REE materials can be recovered from the separated process water. The REE materials can be recovered from the process water by precipitation, e.g., using oxalic acid, or extraction. Other methods for recovering REE from the process water include mineral processing and physical beneficiation, deep eutectic solvents/ionic liquids extraction, acid dissolution, high temperature phase separations, use of REE selective sorbents, photophoresis, in-situ brine injection and extraction, reactive grinding, etc. In other aspect of the present disclosure, the treated tailings consolidate the fines and REEs are among the consolidated materials. The process water can then be separated from the consolidated material. The consolidated material can then be leached with acid, e.g., nitric acid, sulfuric acid, etc., followed by extraction with solvent and/or ion exchange resins and precipitated. Alternatively, the consolidated material can then be treated with a caustic reagent such as sodium hydroxide to decompose certain of the materials to form hydroxides of the REEs followed by leaching in acid, e.g., HCl.

In addition, the tailings which include REE materials can be treated with at least one polymer flocculant and optionally sand to form the treated tailings. The treated tailings can have a salt-tailings concentration of at least 0.5 wt % of the at least one highly water soluble salt and preferably no less than about 0.70 wt %, such as at least about 1 wt %, 1.25 wt %, 1.5 wt %, 1.75 wt %, 2 wt % and even at least about 2.5 wt %, 3 wt %, 4 wt %, 5 wt %, etc. of the at least one highly water soluble salt.

The process of the present disclosure allows for large scale treatment of tailings in a continuous or semi-continuous process with further recovering, recycling and purifying at least a portion of the process water in the tailings and optionally recovering REE materials. When non-hydrolyzing, highly water soluble salts are used in the processes of the present disclosure, the process water separated from an initial treated tailings can advantageously include a significant amount of the one or more highly water soluble salt(s) initially used to treat the tailings.

In practicing aspects of the processes of the present disclosure and the various embodiments thereof, the separated process water can include the at least one highly water soluble salt and the process can further comprise one or more of: (i) recovering at least a portion of the separated process water; (ii) recycling at least a portion of recovered separated process water to treat additional tailings; and/or (iii) purifying at least a portion of recovered process water. In some implementations, the recovered separated process water, which includes the highly soluble salts(s), can be processed to concentrate the highly soluble salts(s) in the water. For example, a reserve osmosis system, which generates desalted water and a waste brine, can be used to generate a brine including the highly soluble salts(s) from recovered separated process water from the treated tailings.

In other embodiments, the separated process water includes REE materials salt and the process further includes recovering at least a portion of the separated process water and recovering the REE materials and/or purifying at least a portion of the recovered process water.

FIG. 1A schematically illustrates an exemplary continuous or semi-continuous process. As shown in the figure, tailings are treated with one or more highly water soluble salt(s), and optionally one or more polymer flocculant(s) and optionally coarse particles (sand) by combining a stream of the salt(s) (101a), which can be an aqueous solution with a stream of the tailings (103a). Optionally, tailings can also be treated with one or more polymer flocculant(s) by combining a stream of the flocculants(s) (102a), which can be as an aqueous solution, with the tailings stream (103a). Alternatively, the salts(s) and flocculant(s) can be combined together as a solution to treat the tailings as a stream thereof. Coarse particles (sand) can also be added to the tailings or stream thereof and/or to any or all of the solution streams.

The solution streams of salt(s) and polymer(s) can be sourced from holding tanks 101 and 102 and the streams of tailings and sand can be sourced from holding tanks or ponds 103 and 105, respectively. Alternatively, the tailings can be sourced directly from an ore extraction process.

For this embodiment, the stream of salt(s) (101a) and polymer(s) (102a) and tailings stream (103a) are carried to mixing device 107 and the combination mixed. (A stream of sand (105a) can be optionally added). Mixing device 107 can be an inline mixer, a mixing tank, ribbon mixer or other mixing device that can mix streams 101a, 102a, 103a and, optionally 105a. For this embodiment, the tailings are combined with the salt(s) followed by polymer(s) and as solutions. However, the tailings can be treated with an aqueous solution including both the salt(s) and polymer(s). In some embodiments, the combination of the streams in a line can cause sufficient mixing to eliminate the need for a separate mixing device, e.g., inline mixing, and the combined streams can be carried directly to a tailings pond or a mechanical dewatering device to separate consolidated material from process water.

As shown in the embodiment of FIG. 1A, after mixer 107, the treated tailings, which include a consolidated material and process water, is transferred to Solid/Liquid separator 109 to separate the process water from the consolidated material. Such devices include, for example, one or more of a decanting, filtering, electrofiltering, cross-flow filtering, gravity draining, or vacuuming device or combination thereof and/or by one or more of a device for dewatering consolidated material such as a centrifuge, decanting centrifuge, dewatering screw, hydrocyclone, vacuum belt filter, filter press or pressing devices, etc. or combinations thereof.

Separated process water can be recovered and collected in a tank or pond (111) and separated consolidated material can be recovered and collected or transported (113). For this embodiment, a stream of recovered process water (111) includes the process water from the tailings diluted with stream 101a and thus includes residual salt(s) from the one or more highly water soluble salt(s) and can possibly include residual polymer(s) from the one or more polymer flocculant(s) as well as components from tailings. If the tailings include REE materials, the recovered stream of process water (111) and/or the consolidated material (113) can also include REE materials. There can also be highly water soluble salts that are constituents of the original treated tailings and these become part of the recovered process water (111). The recovered process water (111) can be transferred to a water purifying system (115) to purify at least a portion of the recovered process water 117 which can be recycled in the mining process. Water purifying systems that can be used for embodiments of the processes of the present disclosure include reverse osmosis systems, vacuum distillation systems, electrodialysis, filtration systems, etc. The remaining, non-purified recovered process water or brine, which includes the highly water soluble salts from stream 101a and potentially highly water soluble salt(s) that are constituents of the original tailings, (119) can be recycled back to the treatment process. For this embodiment, at least a portion of the non-purified recovered process water can be recycled back to holding tank 101 and deficiency in the concentration of the salt(s) or polymer(s) can be corrected by adding additional highly water soluble salt(s) or polymer flocculant(s) from one or more make-up tanks such as make-up containers 121 and 122.

The process of the present disclosure can also include recovering REE materials from recycled separated process water or from the consolidated solids. The REE materials can be recovered from the process water by precipitation, e.g., using oxalic acid, or extraction. Other methods for recovering REE from the process water include mineral processing and physical beneficiation, deep eutectic solvents/ionic liquids extraction, acid dissolution, high temperature phase separations, use of REE selective sorbents, photophoresis, in-situ brine injection and extraction, reactive grinding, etc. The process of the present disclosure can also include recovering REE materials from the consolidated solids by acid leaching or caustic decomposition.

In addition, the consolidated solids can be recovered. The recovered consolidated solids can include residual highly water soluble salt(s) from the treatment of the tailings. When the salt used in treating the tailings are beneficial to plant life, such as an ammonium based salt or sulfate based salt or phosphate based salt, the residual salt can act as a fertilizer with the consolidated solids. The recovered consolidated solids can include REE materials which can be separated from the consolidated solids as explained elsewhere.

Figure 1B:
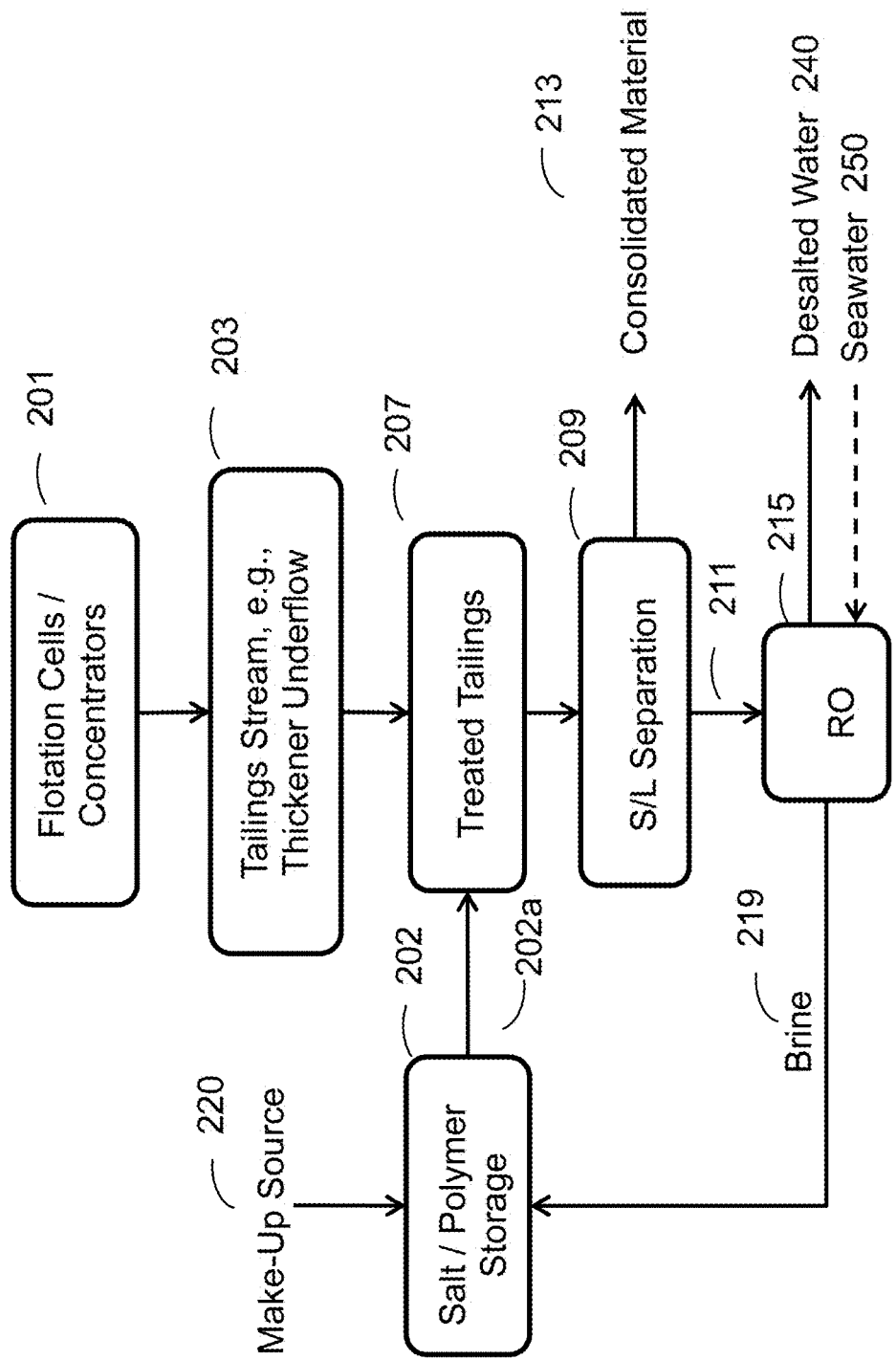
FIG. 1B schematically illustrates another process of consolidating a tailings stream in accordance with aspects of the present disclosure.

FIG. 1B schematically illustrates another exemplary continuous or semi-continuous process. For this embodiment, tailings from a metal ore, such as tailings from copper ore processing are illustrated. As shown in the figure, flotation cells or concentrator (201) generates tailings 203. Many processes of metal and even non-metal ore include a concentration step in which valuable minerals are concentrated by flotation in an aqueous mixture including various agents. The valuable minerals are separated and tailings stream is produced. In this particular example, the tailings can be a thickener underflow tailings stream. Such thickener underflow streams can still benefit from treatment with a highly water soluble salt and optionally additional polymer flocculant to further consolidate solids in accordance with processes of the present disclosure. In accordance with aspects of the present processes, the tailings stream is treated with a stream of an aqueous solution including at least one highly water soluble salt. For this embodiment, the aqueous solution also includes the at least one polymer flocculant. As shown in FIG. 1B, tailings stream 203 is combined with an aqueous solution stream including the at least one highly water soluble salt and the at least one polymer flocculant (202a) to produce a treated tailings stream 207. For this embodiment, aqueous solution stream 202a and tailings 203 are mixed in-line to produce treated tailings 207. Combining the streams (202a and 203) produces treated tailings that include a consolidated material in process water.

Although not shown, the tailings could have been treated with separate streams of the salt(s) and flocculant(s). The aqueous streams of salt(s) and polymer flocculant(s) can be sourced from storage 202. In certain embodiments, seawater is used as the source of the highly water soluble salt as a make-up source of the salt in 220. In other, embodiments, brine from a reverse osmosis system is used as the source of the highly water soluble salt as a make-up source of the salt in 220 and in still further embodiments, both seawater and brine are used as the source of the highly water soluble salt as a make-up source of the salt in 220.

For this embodiment, the treated tailings are carried to a solids/liquid separator (209). The S/L separator separates the process water of the treated tailings from the consolidated material. Such S/L separators include, for example, one or more of a centrifuge, decanting centrifuge, dewatering screw, hydrocyclone, vacuum belt filter, filter press or pressing devices, etc. or combinations thereof. S/L separator 209 generated a stream of consolidated material 213 and a stream of separated process water 211. Process water stream 211 includes the process water from tailings stream 203 diluted with aqueous solution stream 202a and thus includes residual salt(s) from the one or more highly water soluble salt(s) and can possibly include residual polymer(s) from the one or more polymer flocculant(s). At least a portion, if not all, of process water stream 211 can be recovered and purified with a reverse osmosis system 215.

Reverse osmosis system 215 can concentrate the at least one highly soluble salt in the recovered portion of separated process water 211 to form brine 219. At least a portion, if not all, of the brine 219 can be cycled back to salt/polymer flocculant storage 202 to treat additional tailings 203. Reverse osmosis system 215 can concentrate the at least one highly soluble salt to a concentration of greater than 2 wt % such as greater than 4 wt %, 5 wt %, 6 wt %, 7 wt %, 8 wt %, 9 wt %, 10 wt % and higher such that the salt-composition concentration in salt/polymer flocculant storage can be at an equilibrium of about 2 wt % to about 10 wt %, and values therebetween, or higher. The aqueous solution stream including the at least one highly water soluble salt and the at least one polymer flocculant (202a) can be combined with the tailings stream 203 stream at a ratio range of tailings to salt solution including about 30:1 to 1:1, 20:1 to 1:1, 15:1 to 1:1, 10:1 to 1:1, 5:1 to 1:1, and/or about 2:1 to 1:1 tailings to salt solution.

Reverse osmosis system 215 can also be used to generate desalted water 240 from seawater 250 in which desalted water 240 is used in other processes of the mining operation. Waste brine from system 215 can be used as a source of the highly soluble salt to treat tailings thereby improving efficiency of the overall operation and reducing the adverse environmental impact of discharging brine into the environment. In addition, seawater can be used as a source of the highly water soluble salt to treat tailings such as providing seawater in make-up source 250.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Coal Ash Slurry Consolidation

Figure 2:
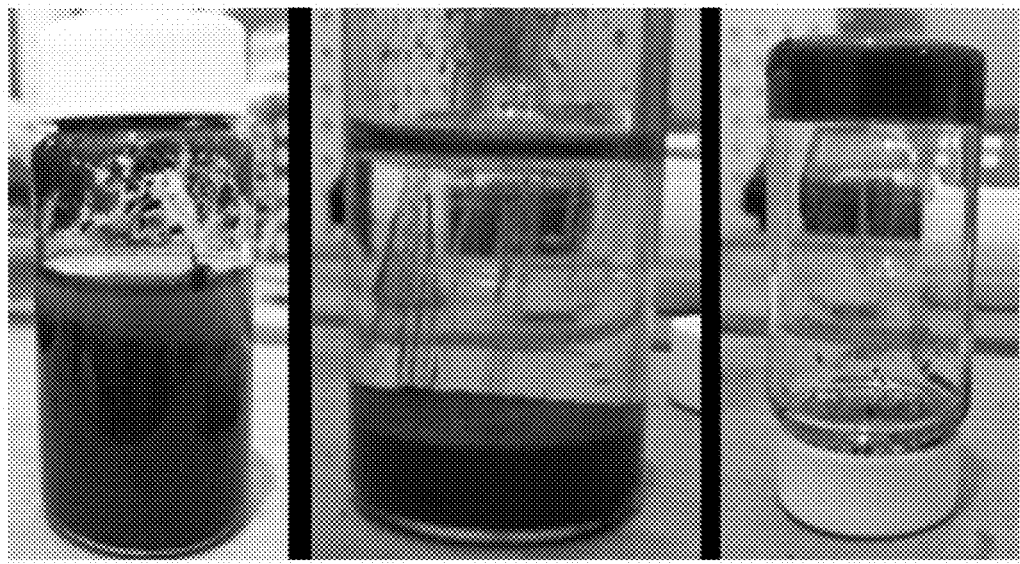
FIG. 2 are pictures of vials containing waste coal slurry treated according to an embodiment of the present disclosure. The pictures show coal slurry after adding an ionic solution (left), then centrifuging (middle) and after removal of supernatant solution (right).

An initial sample of a coal ash slurry was analyzed by infrared spectroscopy to determine the content of solids content. Further, the sample was estimated to have 30% or more coal fines present, i.e., a mixture of fine coal particles and fine mineral particles. Approximately 5 g of the coal slurry was placed in a vial and an equal weight of an aqueous ionic solution was added and the diluted slurry shaken to mix the components. The aqueous ionic solution was composed of water, 10 wt % ammonium sulfate and 0.1 wt % polyacrylamide (PAM). Settling started immediately, as can be seen in the picture on the left in FIG. 2. The vial was then centrifuged for 30 seconds at 3000 rpm and the particles consolidated into a compact mass, as shown in the picture in the center of FIG. 2. The supernatant liquid appeared to be clear, with no visible suspended particles. Upon removal of the liquid it was found that the compacted solids have enough cohesive strength to hold their shape when the vial was inverted, as can be seen in the picture on the right in FIG. 2.

Figure 3:
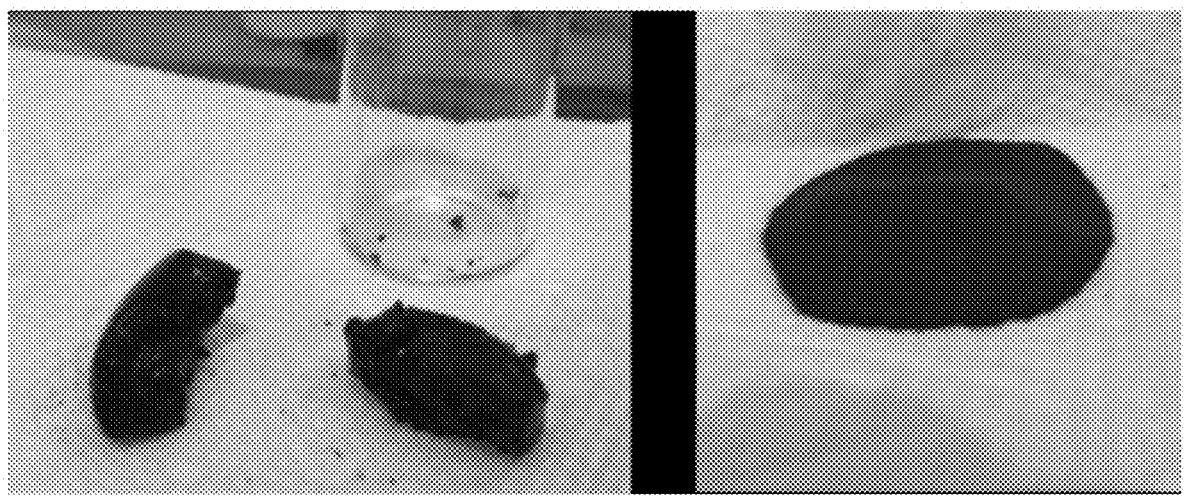
FIG. 3 are pictures of the dewatered coal slurry from FIG. 2 after removal from the vial (left) and subsequent hand-pressing between paper towels.

The material was removed from the vial (FIG. 3, left) and a portion dried. The consolidated material had an initial solids content of 54%. Some of the remainder was pressed (by hand) between paper towels (FIG. 3, right). This pressed material had a solids content of 74%.

Varying Salt and Salt Concentration in Treating Oil Sands Tailings

Additional experiments were carried out with various highly water soluble salts and in different concentrations and with and without sand to treat oil sands tailings. A series of salt/polymer solutions were prepared. All of the salt/polymer solutions included 0.1 wt % of polyacrylamide (PAM) but varied the type and concentration of the salt. For example, a series of 10 wt %, 5 wt % and 2 wt % calcium chloride solutions each with 0.1 wt % of PAM were prepared and used to treat MFT. Other 10 wt %, 5 wt % and 2 wt % salt solutions of ammonium sulfate, potassium chloride, etc. were prepared each with 0.1 wt % of PAM. An equal weight of a particular salt/polymer solution was then combined with MFT, with or without sand, in a vial followed by vigorous mixing. The vials were then centrifuged at 3000 rpm on a LW Scientific laboratory centrifuge for 30 seconds to form a consolidated material in the form of a slurry. After centrifugation, the supernatant liquid was separated from the consolidated material by a pipette. The consolidated material was then weighed, dried and reweighed to determine a solids content of the consolidated material. The various salts and their concentrations which were used to treat MFT and the resultant solids content data are summarized in Tables 1 and 2 below.

TABLE 1

Solids content of MFT treated with an equal weight of a salt/PAM solution without the addition of sand and after centrifugation.

| Salt (+0.1 wt % PAM) No Sand | 10% Concentration[1] | 5% Concentration[2] | 2% Concentration[3] |
|---|---|---|---|
| Ferric Chloride ($FeCl_3$) | 34.9% | — | 35.6% |
| Aluminum Sulfate ($Al_2(SO_4)_3$) | 33.1% | — | 34.1% |
| Calcium Chloride ($CaCl_2$) | 36.8% | 37.1% | 35.8% |
| Ammonium Sulfate ($NH_4SO_4$) | 33.1% | 31.8% | 31.4% |
| Potassium Chloride (KCl) | 35.4% | 32.4% | 33.5% |

TABLE 2

Solids content of MFT treated with an equal weight of a salt/PAM solution with the addition of sand (SFR ratio 1:1) after centrifugation.

| Salt (+0.1 wt % PAM) With Sand | 10% Concentration[1] | 5% Concentration[2] | 2% Concentration[3] |
|---|---|---|---|
| Ferric Chloride ($FeCl_3$) | 45.7% | — | 52.8% |
| Aluminum Sulfate ($Al_2(SO_4)_3$) | 51.4% | — | 53.7% |
| Calcium Chloride ($CaCl_2$) | 58% | 56.8% | 56.1% |
| Ammonium Sulfate ($NH_4SO_4$) | 53.6% | 52.3% | 53.5% |
| Potassium Chloride (KCl) | 53.4% | 52.5% | 53.9% |

1. The salt-tailings concentration was about 5 wt %.
2. The salt-tailings concentration was about 2.5 wt %.
3. The salt-tailings concentration was about 1 wt 5.

Table 1 reports the solids content of dried consolidated material following treating of MFT with the various salt/polymer solutions without sand. After centrifugation for just 30 seconds, the highly water soluble salts gave solids contents for the consolidated materials in a range between about 31%-37%. However, the use of highly water soluble salts having a multivalent cation such as the aluminum and ferric cations appeared to cause fouling of the vial walls and gave a less cohesive consolidated material as compared to highly water soluble salts having a monovalent cation under the tested conditions. In some tests using salt concentrations of 10%, the clarified water sitting on top of the consolidated materials were removed using a pipette and the wet solids pressed between paper towels. It was found that the salts with multivalent cations, aluminum chloride ($AlCl_3$), ferric chloride ($FeCl_3$) and calcium chloride ($CaCl_2$)), which all gave significant deposits of a slimy material on the vial walls, were less cohesive than the pressed solids obtained using salts with monovalent cations, such as the ammonium salts $NH_4Cl$ and $(NH_4)_2SO_4$.

Table 2 reports the solids content of dried consolidated material following treating MFT with the various salt/polymer solutions and sand. Sand was added with a 1:1 sand to fines ratio (i.e., 1.5 g of sand was added to the 5 gm of MFT having 30% solids to give a 1:1 ratio of the weight of sand to that of the solids in the MFT). After centrifugation for just 30 seconds, the highly water soluble salts gave solids contents for the consolidated materials in a range between about 46%-58%, which was significantly higher than the range of solids contents without use of sand. Although the solids content of the vials containing added sand is twice those without sand, the volume of the centrifuged slurry is about the same.

The data in Tables 1 and 2 show that addition of 2 wt % salt solution to treat MFT was as effective as a 10 wt % salt solution. That is, a 1 wt % salt-tailings concentration was as effective as a 5 wt % salt-tailings concentration. Since an equal weight of the salt/polymer solution was used to treat MFT, the salt concentration of the added salt in the treated tailings is one-half of the concentration in the salt/polymer solution, i.e., the added 2 wt % salt solution provided a 1 wt % salt-tailings concentration and the 10 wt % salt solution provided a 5 wt % salt-tailings concentration. The salt-tailings concentration in treated MFT can be achieved in a number of ways. For ease of handling in the foregoing vial tests, it was convenient to combine equal weights of salt/polymer solutions to MFT. However, smaller amounts of salt/polymer solutions with higher concentrations thereof to give the same salt-tailings concentration give equivalent results of consolidated materials.

Centrifuging in flat-bottomed vials is not as effective in terms of producing a high solids material as using centrifuge tubes. It should be kept in mind that for all sets of laboratory vial and tube tests, there is always solution remaining in the voids between the particles. It will be shown later that the solids content of the consolidated material can easily be increased from the 46%-58% range by simply draining or the use of mechanical dewatering methods known to the art, such as filter presses, belt filters, cross-flow filtering, dewatering sand screws, decanting centrifuges, hydrocyclones, etc.

Figure 4:
FIG. 4 shows pictures of vials containing mature fine tailings from oil sands processing treated with an ammonium salt solution including a polyacrylamide flocculant at the concentrations indicated in the figure.
Figure 4:

Varying Salt Concentration and Polymer Concentration in Treating Oil Sands Tailings When salt, polymer and sand are used together, salt-tailings concentrations in excess of 0.5 wt % and preferably no less than about 0.70 wt %, such as at least about 1 wt %, should be used to achieve reasonably fast consolidation of the solids in the tailings. In addition, although a degree of consolidation of the fines/sand mixture is obtained at polymer-tailings concentrations as low as 0.01 wt % for relatively short processing times, superior results are obtained at polymer-tailings concentrations of 0.05% and higher. These preferences were determined by a set of vial experiments. The top set of vials in FIG. 4 shows results obtained by adding 5 g of a 2 wt % ammonium sulfate (($NH_4)_2SO_4$) solution containing PAM to 5 g of MFT. Sand was also added to give a sand-to-fines ratio of 1:1 (i.e., 1.5 g of sand was added). The amount of PAM in the solutions was varied between 0.1% (by weight) and 0.02% (by weight). The bottom set of vials show what is observed when a 1 wt % of the ammonium sulfate was used. The vials were centrifuged at 3000 rpm for 30 seconds to accelerate settling.

It can be seen that for all the vials treated with the 1 wt % $(NH_4)_2SO_4$ solutions, there is a degree of settling of the fines and sand, but the supernatant liquid contains a significant amount of suspended particles. In addition, visually there appears to be a degree of segregation of the sand and fines. In contrast, the MFT treated with a 2 wt % $(NH_4)_2SO_4$ solution containing 0.1 wt % PAM showed settled and compacted solids in contact with a clear supernatant. As the amount of polymer in the solution is reduced from vial A4 to E4, the clarity of the supernatant decreases, as more suspended particles remain in the liquid phase. Greater clarity of the supernatant liquid should be achievable at longer centrifuge times, but for short processing times, treating MFT to result in a salt-tailings concentration of no less than about 0.5 wt % and a polymer-tailings concentration of no less than about 0.04 wt % are preferable.

The solids contents of the consolidated materials in each of the vials shown in FIG. 4 was determined by drying, i.e., the centrifuged consolidated material was separated from its supernatant liquid, the wet mass weighed, dried and reweighed to determine a solids content. The solids content of the consolidated materials for the sets of vials are summarized in Table 3.

TABLE 3

The solids content of centrifuged ammonium sulfate/PAM treated MFT as determined by separating and drying consolidated material.

|  | 0.1% PAM % Solids | 0.08% PAM % Solids | 0.06% PAM % Solids | 0.04% PAM % Solids | 0.02% PAM % Solids |
|---|---|---|---|---|---|
| 2% $(NH_4)_2SO_4$ | 60.3% | 58.8% | 58.1% | 52.0% | 48.5% |
| 1% $(NH_4)_2SO_4$ | 54.4% | 57.2% | 58.1% | 56.3% | 44.6% |

It can be seen that for the 2 wt % $(NH_4)_2SO_4$ solution containing 0.1 wt % PAM, a solids content of just over 60% was achieved. This decreased only slightly when treating MFT with solutions including PAM concentrations of 0.08 wt % and 0.06 wt %, but significantly at lower PAM concentrated solutions. Treating MFT with an equal weight of the $(NH_4)_2SO_4$/polymer solutions resulted in a salt-tailings concentration of about 1 wt % for each of vials A4-E4, and for vial A4, a polymer-tailings concentration of about 0.05 wt % PAM, for vial B4 a polymer-tailings concentration of about 0.04 wt % PAM, for vial C4 a polymer-tailings concentration of about 0.03 wt % PAM, for vial D4 a polymer-tailings concentration of about 0.02 wt % PAM, and for vial E4 a polymer-tailings concentration of about 0.01% PAM. For the 1 wt % $(NH_4)_2SO_4$ solutions, the solids content was very variable, reflecting the problems with segregation of coarse and fine particles in the consolidated materials in these experiments.

Increased Salt Concentration Allows for Lower Polymer Concentration

Figure 5:
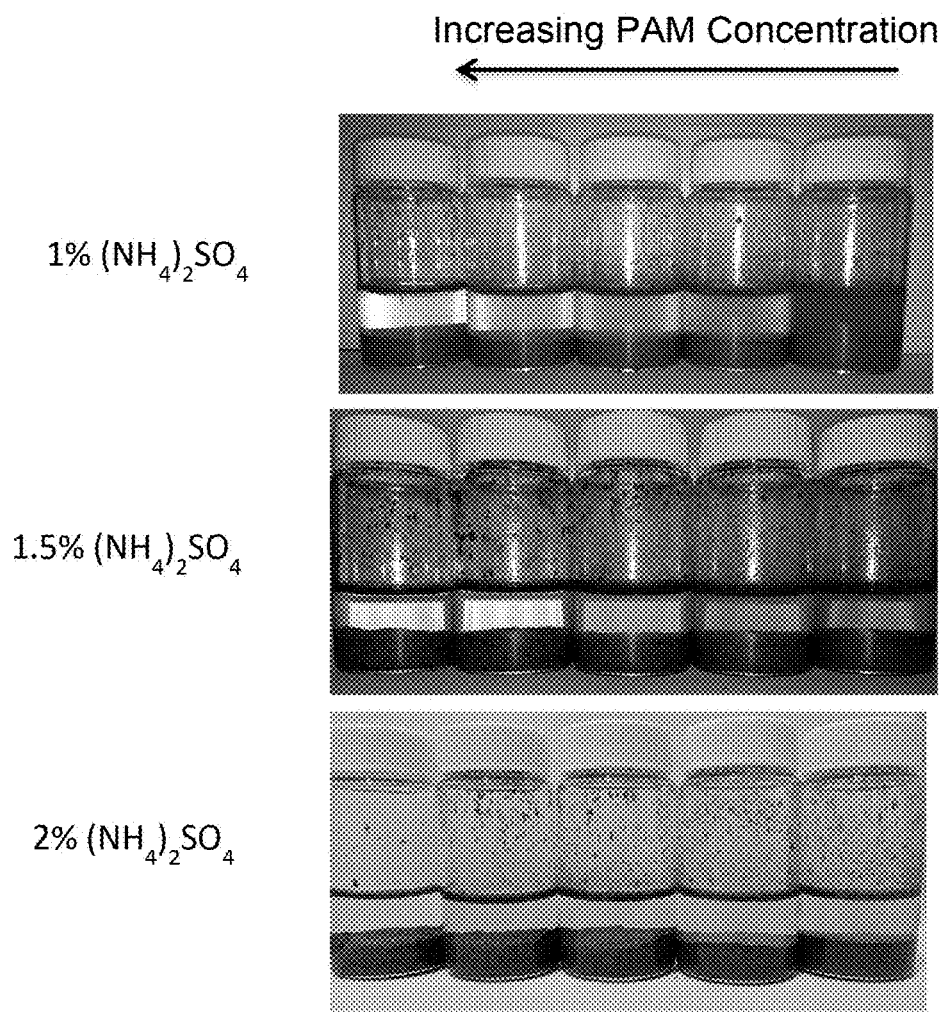
FIG. 5 shows pictures of vials containing mature fine tailings treated with an ammonium salt and a polyacrylamide flocculant and illustrate effects of increasing salt concentration and reducing polymer concentration under the conditions tested.

When salt, polymer and sand are used together to treat tailings, it was observed that the polymer-tailings concentration can be reduced if the salt-tailings concentration is increased under certain circumstances. Thus, very low polymer-tailings concentration can achieve reasonably fast consolidation of solids in the tailings if the salt-tailings concentration is increased. FIG. 5 illustrates that as the salt concentration increases, less polymer flocculant is needed to obtain clear supernatant solutions. For these tests, the polymer-tailings concentration increases from 0.01% to 0.05% in 0.01% increments from right to left while the salt-tailings concentration increases from 1% to 2% from top to bottom.

Varying Polymer Concentration in Treating Oil Sands Tailings with Seawater

Figure 6:
FIG. 6 shows a picture of vials containing mature fine tailings from oil sands processing treated with seawater which included varying amounts of a polyacrylamide flocculant.

For these experiments, solutions of seawater (sourced from the U.S. eastern shore of the Atlantic Ocean) were prepared with various concentrations of a nonionic polyacrylamide (available from SNF as FA920) between 0.1% (by weight) and 0.02% (by weight). The concentration of highly soluble salts in the seawater is believed to be greater than 3 wt %. The seawater-polymer solutions were used to treat MFT from oil sands processing. An equal amount of seawater-polymer solution was used to treat MFT (about 5 g of seawater-polymer solution to about 5 g of MFT) in a vial. The treated mixtures were first stirred and then the vials were centrifuged at 3000 rpm for 30 seconds to accelerate settling. The results are shown in the picture of FIG. 6. From left to right, the seawater used to treat the MFT included about 0.1 wt %, 0.08 wt %, 0.06 wt %, 0.04 wt % and 0.02 wt % of the polymer flocculant, respectively. These experiments show that a mixture of highly soluble salts sourced from an ocean can be used in the process of the present disclosure.

Treating Tailings from Copper Ore Processing

Figure 7A:
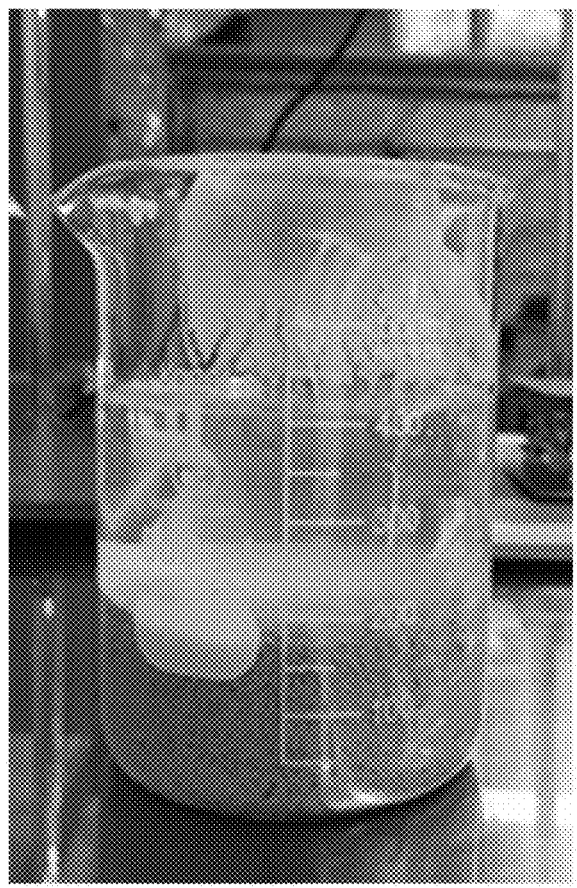
FIGS. 7A, 7B and 7C show picture of treating tailings generated from processing copper ore.
Figure 7B:
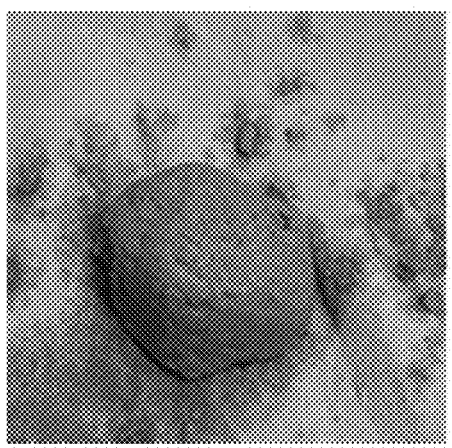
Figure 7C:
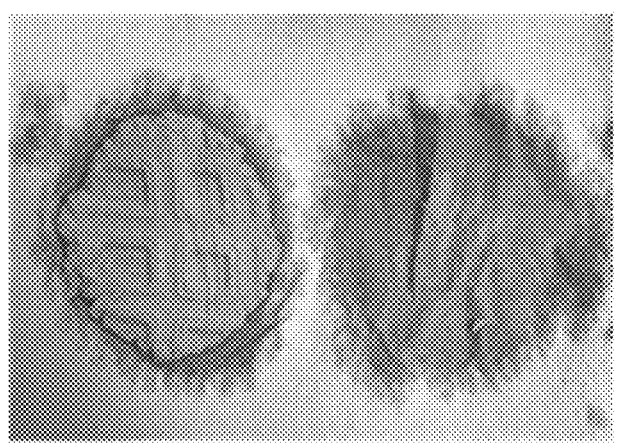

A sample of tailings generated from processing copper ore was combined with an approximate equal amount of an aqueous ionic solution in a 500 ml beaker. The aqueous ionic solution comprised water, a highly water soluble salt and flocculant (polyacrylamide (PAM)). Upon combining and slightly mixing the tailings with the aqueous ionic solution, the solids started to consolidate almost immediately. After standing for just a few minutes, the sold aggregated and settled to the bottom with a clarified water layer above the consolidated solids. See FIG. 7A. The consolidated solids were also cohesive. Consolidated material taken from the beaker was readily compressed by hand to form a ball (see FIG. 7B). A step test, in which the hand compacted ball shown in FIG. 7B was placed between paper towels and stepped on by a tester, showed that the consolidated material does not foul paper towels (See FIG. 7C). Such a test is an indication of how readily the consolidated material can be filtered and mechanically dewatered in which a low fouling indicates good filterability and mechanical dewatering. The solids content of the pressed tailings was measured to be about 75%.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein.

Such equivalents are considered to be within the scope of this invention, and are covered by the following claims.

What is claimed is:

1. A process of consolidating solids in metal-based ore tailings in which greater than 5 wt % of the solids are solid particles with sizes equal to or less than 44 μm, the process comprising:
   treating the tailings with at least one highly water soluble salt to form a treated tailings including a consolidated material in process water, wherein the consolidated material includes the solids, and the at least one highly water soluble salt includes an ammonium based salt that consists of, as the cation of the salt, $NH_4^\pm$; and
   separating the process water from the consolidated material, wherein the separated process water includes the at least one highly water soluble salt used to treat the tailings,
   wherein the treated tailings have a salt-tailings concentration of the at least one highly water soluble salt of at least 0.5 wt % prior to separating the process water from the consolidated material.

2. The process of claim 1, wherein the at least one highly water soluble salt further includes an alkali halide salt.

3. The process of claim 1, wherein the treating of the tailings with the at least one highly water soluble salt comprises treating the tailings with a natural body of saline water, which includes the at least one highly water soluble salt therein.

4. The process of claim 1, wherein the treated tailings has a salt-tailings concentration of the at least one highly water soluble salt of at least 1 wt %.

5. The process of claim 1, further comprising treating the tailings with at least one polymer flocculant concurrent with or subsequent to the treating of the tailings with the at least one highly water soluble salt to form the treated tailings.

6. The process of claim 5, wherein the at least one polymer flocculant is a polyacrylamide or co-polymer thereof.

7. The process of claim 5, wherein the treated tailings has a polymer-tailings concentration of the at least one polymer flocculant of up to about 0.05 wt %.

8. The process of claim 5, wherein the treating of the tailings includes combining a stream of tailings with a solution including the at least one highly water soluble salt and the at least one polymer flocculant to produce a treated tailings stream.

9. The process of claim 5, wherein the treating of the tailings includes combining a stream of tailings with a stream of an aqueous solution including the at least one highly water soluble salt and a stream of an aqueous solution including the at least one polymer flocculant to produce a treated tailings stream.

10. The process of claim 1, wherein the treating of the tailings includes combining a stream of tailings with a stream of an aqueous solution including the at least one highly water soluble salt to produce a treated tailings stream.

11. The process of claim 10, wherein the stream of the aqueous solution including the at least one highly water soluble salt is a natural body of saline water, which includes the at least one highly water soluble salt therein.

12. The process of claim 10, wherein the streams are mixed in line and optionally with an inline mixer to produce the treated tailings stream.

13. The process of claim 1, wherein the separating of the process water from the consolidated material includes mechanically dewatering the consolidated material.

14. The process of claim 1, wherein, after the process water is separated, the consolidated material has a solids content of at least 45% by weight.

15. The process of claim 1, further comprising recovering at least a portion of the separated process water from the treated tailings and concentrating the at least one highly soluble salt in the recovered portion of separated process water to form a brine.

16. The process of claim 15, further comprising purifying at least a portion of the recovered portion of separated process water.

17. The process of claim 1, wherein the tailings are tailings from processing a metal-based ore selected from aluminum, copper, zinc, lead, iron, gold, silver, molybdenum, or lithium.

18. The process of claim 17, wherein the tailings are thickener underflow tailings.

19. The process of claim 1, wherein the ammonium based salt is at least one selected from the group consisting of ammonium acetate ($NH_4C_2H_3O_2$), ammonium chloride ($NH_4Cl$), ammonium bromide ($NH_4Br$), ammonium carbonate (($NH_4$)$_2CO_3$), ammonium bicarbonate ($NH_4HCO_3$), ammonium nitrate ($NH_4NO_3$), ammonium sulfate (($NH_4$)$_2SO_4$), ammonium hydrogen sulfate ($NH_4HSO_4$), ammonium dihydrogen phosphate ($NH_4H_2PO_4$), ammonium hydrogen phosphate (($NH_4$)$_2HPO_4$), and ammonium phosphate (($NH_4$)$_3PO_4$).

20. A process of consolidating solids in metal-based ore tailings, the process comprising:
   treating the metal-based ore tailings with at least one highly water soluble salt to form a treated tailings including a consolidated material in process water; and
   separating the process water from the consolidated material, wherein the separated process water includes the at least one highly water soluble salt used to treat the tailings,
   wherein the metal-based ore tailings incudes solids,
   wherein greater than 5 wt % of the solids are solid particles with sizes equal to or less than 44 μm,
   wherein the consolidated material includes the solids,
   wherein the at least one highly water soluble salt includes an ammonium based salt that consists of, as the cation of the salt, $NH_4^+$, and
   wherein the treated tailings have a salt-tailings concentration of the at least one highly water soluble salt of at least 0.5 wt % prior to separating the process water from the consolidated material.

* * * * *